(12) United States Patent
Krause et al.

(10) Patent No.: US 10,156,715 B2
(45) Date of Patent: Dec. 18, 2018

(54) ILLUMINATION DEVICE FOR A PROJECTOR COMPRISING A LIGHT MODULATOR

(71) Applicant: Carl Zeiss AG, Oberkochen (DE)

(72) Inventors: Axel Krause, Jena (DE); Enrico Geissler, Jena (DE); Juergen Kraenert, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 15/634,660

(22) Filed: Jun. 27, 2017

(65) Prior Publication Data

US 2017/0371150 A1    Dec. 28, 2017

(30) Foreign Application Priority Data

Jun. 27, 2016    (DE) .................. 10 2016 111 731

(51) Int. Cl.
| | |
|---|---|
| *B60Q 1/14* | (2006.01) |
| *G02B 26/00* | (2006.01) |
| *G09B 9/36* | (2006.01) |
| *G03B 21/20* | (2006.01) |
| *G03B 21/26* | (2006.01) |

(Continued)

(52) U.S. Cl.
CPC .............. *G02B 26/008* (2013.01); *F21V 9/08* (2013.01); *F21V 14/08* (2013.01); *G03B 21/204* (2013.01); *G03B 21/206* (2013.01); *G03B 21/26* (2013.01); *G03B 33/08* (2013.01); *G09B 9/36* (2013.01); *H04N 9/3114* (2013.01); *H04N 9/3126* (2013.01)

(58) Field of Classification Search
USPC ......................................... 362/283
See application file for complete search history.

(56) References Cited

U.S. PATENT DOCUMENTS

| | | | |
|---|---|---|---|
| 8,382,297 B2 | 2/2013 | Nicholson et al. | |
| 2004/0184005 A1* | 9/2004 | Roth | H04N 9/3114 353/20 |

(Continued)

OTHER PUBLICATIONS

Stephan Bissinger et al., High Resolution LED-Projector Stimulating Night Vision Devices Using Infrared Radiation. IMAGE 2010 Conference, pp. 1-6, Jul. 12, 2010, 6 pages.

*Primary Examiner* — Tuyen K Vo
(74) *Attorney, Agent, or Firm* — Skaar Ulbrich Macari, P.A.

(57) ABSTRACT

An illumination device for a light modulated projector includes a first and a second color wheel. A first filter surface of the first color wheel comprises at least three first surface sections arranged one behind the other, which protrude into an illumination beam path of the illumination device successively on rotation and in each case convey illumination radiation of a different partial range of the visible wavelength range. At least one of the first surface sections of the first filter surface conveys illumination radiation from the infrared range. A second filter surface of the second color wheel comprises a first surface segment which only conveys illumination radiation from the visible wavelength range and a second surface segment which only conveys illumination radiation from the infrared range. The first and second surface segments protrude into the illumination beam path successively on rotation.

15 Claims, 3 Drawing Sheets

(51) Int. Cl.
*G03B 33/08* (2006.01)
*H04N 9/31* (2006.01)
*F21V 9/08* (2018.01)
*F21V 14/08* (2006.01)

(56) References Cited

U.S. PATENT DOCUMENTS

| | | | |
|---|---|---|---|
| 2005/0206855 A1* | 9/2005 | Hori | H04N 9/3114 |
| | | | 353/84 |
| 2007/0086098 A1* | 4/2007 | Sekiguchi | G02B 26/008 |
| | | | 359/892 |
| 2007/0195207 A1* | 8/2007 | Wang | H04N 9/3114 |
| | | | 348/744 |
| 2009/0015791 A1 | 1/2009 | Chang et al. | |
| 2009/0134332 A1* | 5/2009 | Thompson | A63F 13/04 |
| | | | 250/348 |
| 2012/0044461 A1 | 2/2012 | Chang et al. | |
| 2012/0315603 A1 | 12/2012 | Streid | |
| 2016/0316183 A1* | 10/2016 | Cui | H04N 9/3114 |
| 2018/0011392 A1* | 1/2018 | Utsunomiya | G03B 21/16 |

* cited by examiner

ILLUMINATION DEVICE FOR A PROJECTOR COMPRISING A LIGHT MODULATOR

This application claims the benefit of German Patent Application No. 102016111731.5, filed on Jun. 27, 2016, which is hereby incorporated herein by reference in its entirety.

FIELD

The present invention relates to an illumination device for a projector comprising a light modulator.

BACKGROUND

In projectors with light modulator illumination devices, which are often also called digital projectors, the light modulator can be illuminated time-sequentially with light of different colours from the different wavelength ranges in order to generate, time-sequentially, coloured partial images which are then perceptible to an observer only in temporal superimposition as a multi-coloured image. In order to generate, time-sequentially, the different colours, for example a colour wheel with a first filter surface which is rotatable about an axis can be provided, wherein the first filter surface comprises at least three surface segments arranged one behind the other in the direction of rotation which, when the first filter surface is rotated, protrude successively into an illumination beam path from a multi-coloured light source to the light modulator. The light modulator can thus be illuminated with the different colours successively by rotating the colour wheel.

Such digital projectors can be used e.g. for flight simulators. Here it is desired to be able to also project an infrared image at the same time as the multi-coloured image visible to the human eye, in order thus to be able e.g. to train for the use of night vision devices. It is known from U.S. Pat. No. 8,382,297 B2 to provide a special colour wheel for this which, in addition to the at least three surface segments arranged one behind the other for wavelengths from the visible wavelength range, comprises at least one more surface segment for wavelengths from the infrared range, with the result that an infrared illumination of the light modulator can also be carried out time-sequentially when the colour wheel is rotated. However, this is laborious as the colour wheel has to be changed accordingly. The control of the colour wheel and of the light modulator is also changed in this case as an additional surface segment is provided in the colour wheel. In addition, the light output for the visible image is reduced, even if no infrared image is to be projected, as the colour wheel always comprises the surface segment for the infrared range.

SUMMARY

An object of the invention is to provide an illumination device for a projector comprising a light modulator, which overcomes the difficulties noted above as completely as possible.

The disclosure includes an illumination device for a projector comprising a light modulator, wherein the illumination device comprises an illumination beam path which guides coupled-in illumination radiation with wavelengths from the visible wavelength range and from the infrared range up to its end in order to illuminate the light modulator, a first colour wheel comprising a first filter surface and a second colour wheel comprising a second filter surface, which are arranged one behind the other and the filter surfaces of which, each of which is rotatable about an axis, only partly protrude into the illumination beam path, wherein the first filter surface comprises at least three surface segments (or at least three first surface sections) arranged one behind the other in the direction of rotation, which protrude into the illumination beam path successively when the first filter surface is rotated and in each case convey the illumination radiation of a different partial range of the visible wavelength range in the illumination beam path, wherein at least one of the surface segments (or of the first surface sections) of the first filter surface furthermore conveys illumination radiation from the infrared range, and wherein the second filter surface comprises a first surface segment which only conveys illumination radiation from the visible wavelength range and a second surface segment which only conveys illumination radiation from the infrared range, wherein the first and second surface segments are arranged one behind the other in the direction of rotation and protrude into the illumination beam path successively when the second filter surface is rotated.

Because two colour wheels are provided, the time-sequential provision of the illumination radiation from the visible wavelength range and the illumination radiation from the infrared range can be easily adapted individually to the existing basic conditions. In particular, it is possible to provide no illumination radiation from the infrared range and to provide the full light output for the illumination radiation from the visible wavelength range. This can be achieved e.g. by moving the second colour wheel out of the beam path.

The first filter surface can be arranged upstream or downstream of the second filter surface (in the direction towards the end of the illumination beam path).

The two filter surfaces can in each case be formed as transmissive filters. In particular, between the two filter surfaces or between the two colour wheels, an integrator or a light-mixing rod can be provided which serves to homogenize the illumination radiation in order to be able to illuminate the light modulator as uniformly as possible.

The two filter surfaces can in each case be formed annular. However, it is also possible for the filter surfaces to be circular. In particular, the rotational frequency of the first filter surface can be higher than the rotational frequency of the second filter surface. For example, the rotational frequency of the first filter surface can be twice as high as the rotational frequency of the second filter surface.

The surface segments (or first surface sections) of the first filter surface can convey red, blue and green light of the illumination radiation.

Furthermore, the second colour wheel can be brought from its first position, in which a part of the second filter surface always protrudes into the illumination beam path, into a second position, in which no part of the second filter surface protrudes into the illumination beam path.

The illumination device can furthermore comprise a light source which emits the illumination radiation.

Furthermore, further filters can be provided. For example, an ultraviolet filter can be positioned in the illumination beam path.

By the visible wavelength range is meant here in particular the wavelength range from 380 nm to 700 nm. By the infrared range is meant here in particular the wavelength range from greater than 700 nm to 1000 nm, 2000 nm or 3000 nm.

The disclosure also includes a light modulator and an illumination device according to at least one of the aspects and embodiments herein. The light modulator can be a two-dimensional light modulator and can be formed e.g. as a tilting mirror matrix, LCD module or LCoS module. In addition, the projector can comprise a control unit which controls the colour wheels and the light modulator, as well as projection optics which project the image generated by means of the light modulator onto a projection surface.

The projector can be formed such that the different partial images are generated time-sequentially. The partial images are generated one behind the other so quickly that a user can no longer resolve them individually, but only perceives the superimposition of the partial images as a total image.

The projector can comprise two light modulators arranged one behind the other. In particular, in this case, imaging optics are provided which image the first light modulator onto the second light modulator. The provision of two series-connected light modulators increases the maximum contrast of the projector.

It is understood that the features mentioned above and those yet to be explained in the following are applicable, not only in the stated combinations, but also in other combinations or singly, without departing from the scope of the present invention.

Figure 1:
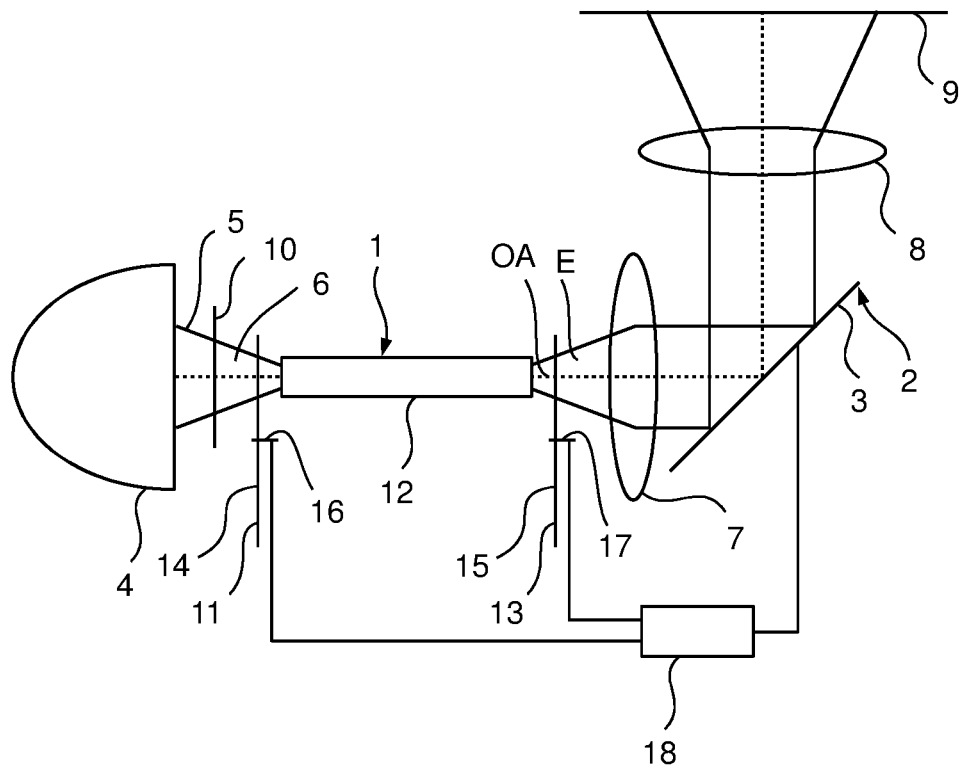
FIG. 1 is a schematic view of an illumination device in accordance with certain embodiments and the projector according to certain embodiments.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

In the example embodiment shown in FIG. 1, the illumination device 1 is provided in a projector 2, which comprises a light modulator 3 (e.g. a tilting mirror matrix).

The projector 2 furthermore comprises a light source 4, which emits illumination radiation 5 with wavelengths from the visible wavelength range and from the infrared range. The illumination radiation 5 strikes the illumination device 1, in which it is guided along an illumination beam path 6 up to the end E of the illumination beam path 6 and, via first optics 7 arranged downstream of the illumination device 1, is directed onto the first light modulator 3 such that the latter is illuminated as uniformly as possible. The projector 2 furthermore comprises second optics 8, which can also be called projection optics, which project the light modulated by the light modulator 3 onto a projection surface 9 in order to generate there an image to be represented.

The illumination device 1 comprises an ultraviolet filter 10, downstream of which, in this sequence, a first colour wheel 11, an integrator 12 or a light-mixing rod 12 and a second colour wheel 13 are arranged. The ultraviolet filter 10 and the light-mixing rod 12 are optional and can also be omitted.

Figure 2:
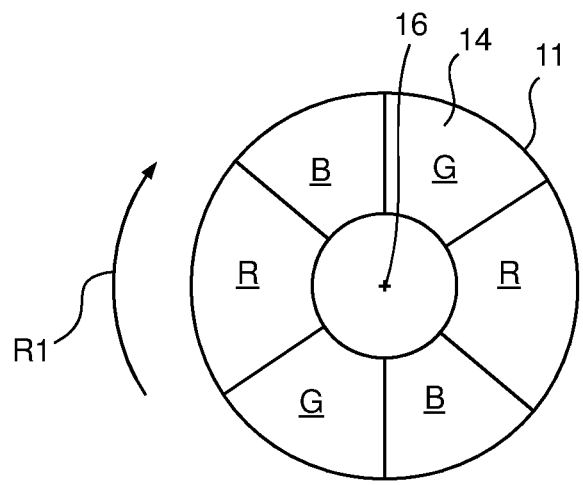
FIG. 2 is a top view of a first colour wheel in accordance with certain embodiments.
Figure 3:
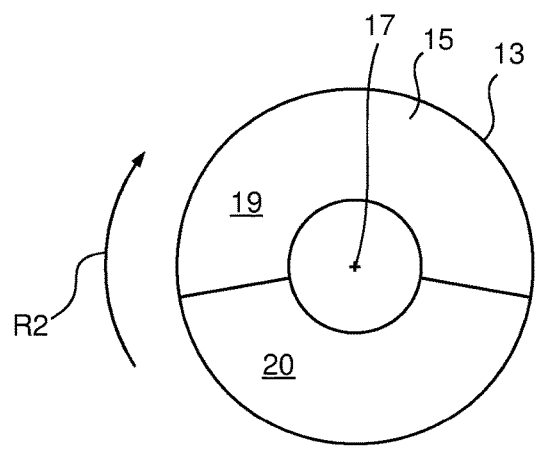
FIG. 3 is a top view of a second colour wheel in accordance with certain embodiments.

The first colour wheel 11 comprises a first filter surface 14 and the second colour wheel 13 comprises a second filter surface 15. The two filter surfaces 14, 15 are formed annular for example, as shown in the top views of the two colour filters 11 and 13 in FIGS. 2 and 3. The filter surfaces 14 and 15 are arranged perpendicular or at an angle other than 90° to the optical axis OA of the illumination device 1 such that only a part of the respective filter surfaces 14 and 15 always protrudes into the illumination beam path 6. Furthermore, the two colour wheels 11 and 13 are formed such that the filter surfaces 14 and 15 in each case are rotatable about an axis 16, 17, wherein the two axes 16 and 17 can extend parallel to the optical axis OA or can have an angle greater than 0° to the optical axis OA (and thus no longer parallel to the optical axis OA). The colour wheels 11 and 13 as well as the light modulator 3 can be controlled by means of a control unit 18 of the projector 2.

The first filter surface 14 comprises six surface segments (or six first surface sections), which are denoted R, G and B, adjoining each other in the direction of rotation R1 of the first filter surface 14. The surface segments R are transmissive for illumination beams with wavelengths for red light, the surface segments G are transmissive for illumination beams with wavelengths for green light and the surface segments B are transmissive for illumination beams with wavelengths for blue light and all the surface segments R, G and B are in each case not transmissive for illumination beams with other wavelengths from the visible length range. Furthermore, only the surface segments G are transmissive for illumination beams from the infrared range. The other surface segments R and B are not transmissive for illumination beams with wavelengths from the infrared range. The extent in the circumferential direction and direction of rotation R1 of the individual surface segments R, G, B is not equally large. The surface segments R, which here in each case extend 73°, have the largest extent. The extent of the surface segments G is smaller than that of the surface segments R and here is 57°. The extent of the surface segments B is again smaller than the extent of the surface segments G and here is 50°.

The second filter surface 15 comprises a first surface segment 19 and a second surface segment 20, which are arranged one behind the other in the direction of rotation R2 of the second filter surface 15. The first surface segment 19 is transmissive for illumination beams from the visible wavelength range and does not allow infrared radiation to pass through. The second surface segment 20 is transmissive for infrared radiation and does not allow illumination radiation from the visible wavelength range to pass through. The extent of the first surface segment R in the direction of rotation R2 here is 200° and the extent of the second surface segment 20 in the direction of rotation R2 here is 160°.

Figure 4:
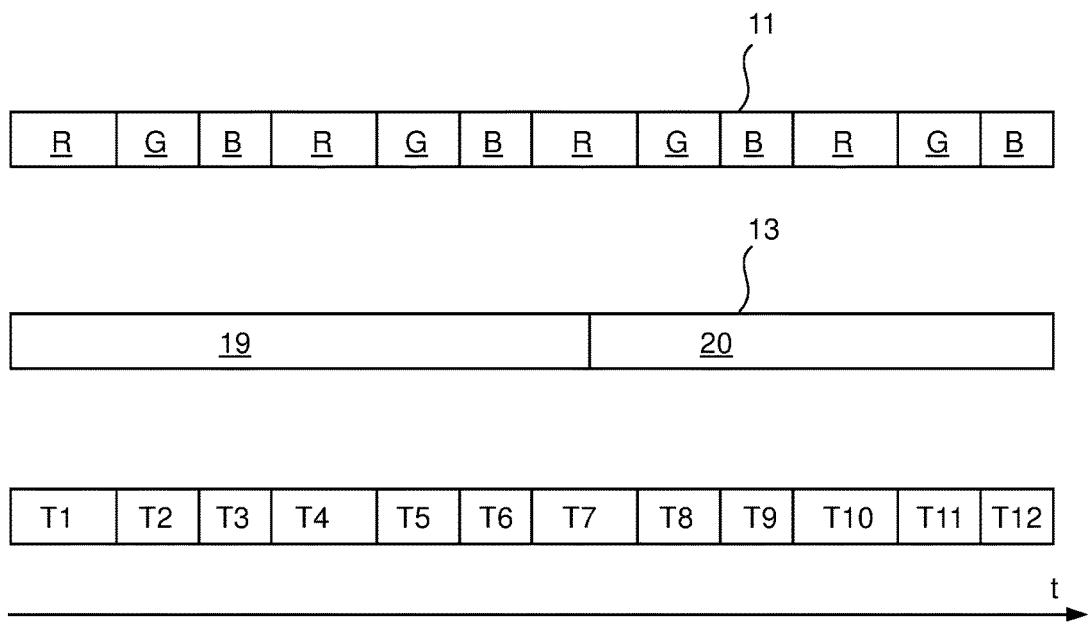
FIG. 4 is a schematic representation to explain partial images generated one after the other over time in accordance with certain embodiments.

The rotation of the two filter surfaces 14 and 15 is carried out by means of the control unit 18 such that the rotational frequency of the second filter surface 15 corresponds to half the rotational frequency of the first filter surface 14. This is represented schematically in FIG. 4, wherein the time t is plotted along the x-axis and in each case the surface segment which is located in the illumination beam path 5 at the respective time point is represented as a rectangle. From this it can be seen that 12 partial images T1, T2, T3, . . . T12 are possible, spectrally resolved, wherein the RGB portions of the colour image to be represented in the visible wavelength range can be generated by means of the partial images T1-T6 and the desired infrared image can be generated by means of the partial images T8 and T11. The partial images T7, T9, T10 and T12 are represented in black. This type of control of the two colour wheels 11 and 13 makes it possible to represent or display, using a conventional control unit 18 which is designed to represent or display three colours (RGB), a visible image based on the three colours RGB and additionally the infrared image.

This is carried out in a known manner in that the modulator 3 is controlled accordingly for each partial image T1-T12 and the partial images T1-T12 follow each other over time so quickly that an observer cannot distinguish the partial images T1-T12 over time and thus only perceives the temporal superimposition of the partial images T1-T12. A colour image and an infrared image are thus generated for the observer at the same time.

When the projector 2 is used in a flight simulator, the infrared image is utilized for example in order to be able to train for night vision conditions using a night vision device. The flight simulator can thus, for example, generate the desired infrared images, which a user of the flight simulator can perceive using his night vision device. With such flight simulators, e.g. it is possible to train for the flying and operation of an airplane or helicopter.

The projector 2 can be formed such that its structure achieves such a high contrast that no excitation of the night vision device is caused by the partial images T7, T9, T10 and T12. In addition, a very high contrast of the projector 2 also helps to represent low brightness values. If the projector 2 achieves the value of approx. 2.5×106:1 for the contrast between completely on and completely off, the intensities for the low brightness values for a y value of 2.2, which lie in the order of magnitude from 10-5 to 10-6 of the maximum intensity, can be correctly represented. The natural ratios for a night vision device can thus be simulated closely.

Figure 5:
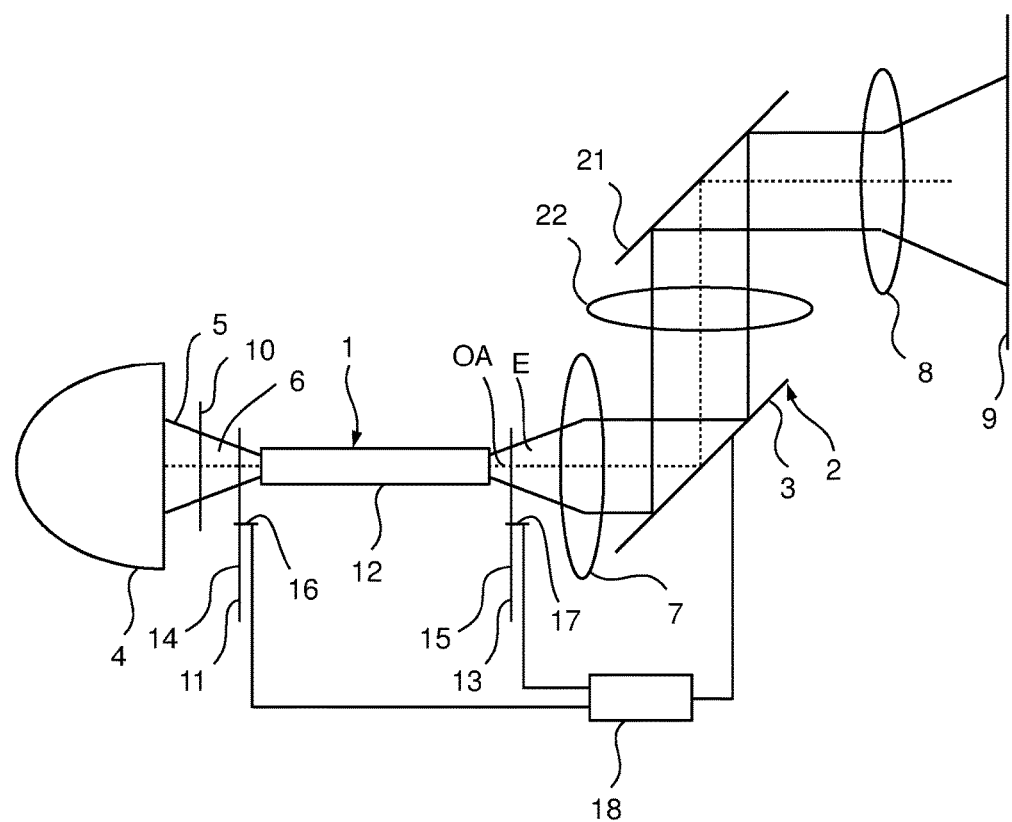
FIG. 5 is a schematic representation of a projector in accordance with certain embodiments.

Such a contrast can be achieved, for example, in that a second light modulator 21 is arranged downstream of the light modulator 3, as shown in the variant of the projector 2 in FIG. 5. Between the two light modulators 3 and 21, imaging optics 22 are preferably arranged which image the light modulator 3 onto the second light modulator 21. The imaging optics 22 can be, for example, 1:1 imaging optics.

In the projector 2, it is advantageous that only one light source 4 is needed to represent the visible image and the infrared image. Although the light source 4 also has to provide the necessary output in the infrared spectral range, this output can be relatively small because of the high sensitivity of the night vision devices available today.

The ratio of the outputs in the visible and in the infrared spectral range can be adapted by further filters (not shown) in the beam path of the projector 2 and in particular in the illumination beam path 5. Different night vision conditions, such as a bright full moon and new moon, can thus be simulated.

The projector 2 can be formed such that the second colour wheel 13 can be moved out of the illumination beam path 5 completely. In particular, the projector 2 is then formed such that in this case the same output is present in the visible spectral range as is present in the case where a projector is used without a special illumination device for generating images in the infrared spectral range.

Naturally, the sequence of the two colour wheels 11 and 13 can be reversed. It is also not necessary for the light-mixing rod 12 to be arranged between the two colour wheels 11 and 13. The two colour wheels 11 and 13 can be arranged e.g. directly one behind the other.

Furthermore, the spectral properties of the colour wheels 11 and 13 can be designed differently. In particular, the segments B and/or the segments R can additionally or alternatively be designed such that they transmit the illumination radiation from the infrared range.

In addition, the number of partial images T1-T12 used can be varied for the individual spectral ranges. The total number of partial images used can also be varied. In addition, the rotational speeds of the two colour wheels 11 and 13 can be varied.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. An illumination device for a projector comprising a light modulator, the illumination device comprising:
    an illumination beam path including an end, the illumination beam path configured to guide coupled-in illumination radiation with wavelengths from the visible wavelength range and from the infrared range up to the end such that the light modulator is illuminated;
    a first colour wheel comprising a first filter surface;
    a second colour wheel comprising a second filter surface;
    a control unit controlling operation of the first and second color wheels and their respective first and second filter surfaces,
    wherein the first filter surface and second filter surface are arranged one behind the other,
    wherein each of the first and second filter surfaces are rotatable about an axis,
    wherein the control unit is configured to operate the first and second filter surfaces such that a rotational frequency of the first filter surface is higher than a rotational frequency of the second filter surface,
    wherein each of the first and second filter surfaces protrude only partly into the illumination beam path,
    wherein the first filter surface comprises at least three first surface sections arranged one behind the other in a direction of rotation of the first colour wheel, the which at least three first surface sections protruding into the illumination beam path successively when the first filter surface is rotated and in each case convey illumination radiation of a different partial range of a visible wavelength range, wherein at least one of the first surface sections of the first filter surface furthermore conveys illumination radiation from an infrared range, wherein the second filter surface comprises a first surface segment which only conveys illumination radiation from the visible wavelength range and a second surface segment which only conveys illumination radiation from the infrared range, and wherein the first and second surface segments are arranged one behind the other in the direction of rotation of the second colour wheel and protrude into the illumination beam path successively when the second filter surface is rotated.

2. The illumination device according to claim 1, wherein the first filter surface is arranged upstream of the second filter surface.

3. The illumination device according to claim 2, wherein the rotational frequency of the first filter surface is twice the rotational frequency of the second filter surface.

4. The illumination device according to claim 3, wherein the first surface sections of the first filter surface convey red, blue and green light of the illumination radiation.

5. The illumination device according to claim 1, wherein the first filter surface is arranged downstream of the second filter surface.

6. The illumination device according to claim 5, wherein the rotational frequency of the first filter surface is twice the rotational frequency of the second filter surface.

7. The illumination device according to claim 6, wherein the first surface sections of the first filter surface convey red, blue and green light of the illumination radiation.

8. The illumination device according to claim 1, wherein the first and second filter surfaces are transmissive filters.

9. The illumination device according to claim 1, wherein a light-mixing rod is arranged between the first and second filter surfaces.

10. The illumination device according to claim 1, wherein the first and second filter surfaces are annular.

11. The illumination device according to claim 1, wherein the rotational frequency of the first filter surface is twice the rotational frequency of the second filter surface.

12. The illumination device according to claim 11, wherein the first surface sections of the first filter surface convey red, blue and green light of the illumination radiation.

13. The illumination device according to claim 1, wherein the first surface sections of the first filter surface convey red, blue and green light of the illumination radiation.

14. Illumination device according to claim 1, in which the second colour wheel is provided such that it can be brought from its first position, in which a part of the second filter surface protrudes into the illumination beam path, into a second position, in which no part of the second filter surface protrudes into the illumination beam path.

15. A projector with a light modulator and an illumination device according to claim 1.

* * * * *

UNITED STATES PATENT AND TRADEMARK OFFICE
CERTIFICATE OF CORRECTION

PATENT NO. : 10,156,715 B2
APPLICATION NO. : 15/634660
DATED : December 18, 2018
INVENTOR(S) : Axel Krause et al.

Page 1 of 1

It is certified that error appears in the above-identified patent and that said Letters Patent is hereby corrected as shown below:

In the Specification

Column 5, Line 45: Delete "the low brightness values for a y value of 2.2, which lie in" and replace with -- the low brightness values for a $\gamma$ value of 2.2, which lie in --.

Signed and Sealed this
Twenty-sixth Day of November, 2019

Andrei Iancu
*Director of the United States Patent and Trademark Office*